(12) United States Patent
Letts

(10) Patent No.: US 11,626,225 B2
(45) Date of Patent: Apr. 11, 2023

(54) MAGNETIC LEVITATION ELECTRICAL GENERATOR

(71) Applicant: Ryan Letts, St. Alban, NY (US)

(72) Inventor: Ryan Letts, St. Alban, NY (US)

( * ) Notice: Subject to any disclaimer, the term of this patent is extended or adjusted under 35 U.S.C. 154(b) by 169 days.

(21) Appl. No.: 17/129,150

(22) Filed: Dec. 21, 2020

(65) Prior Publication Data

US 2021/0110955 A1 Apr. 15, 2021

Related U.S. Application Data

(63) Continuation-in-part of application No. 16/108,439, filed on Aug. 22, 2018, now abandoned, which is a continuation-in-part of application No. 14/814,600, filed on Jul. 31, 2015, now abandoned.

(60) Provisional application No. 62/031,878, filed on Aug. 1, 2014.

(51) Int. Cl.
*H01F 7/02* (2006.01)
*F01D 15/10* (2006.01)

(52) U.S. Cl.
CPC .......... *H01F 7/0236* (2013.01); *F01D 15/10* (2013.01); *H01F 7/0263* (2013.01)

(58) Field of Classification Search
CPC ....... H01F 7/0236; H01F 7/0263; F01D 15/10
See application file for complete search history.

(56) References Cited

U.S. PATENT DOCUMENTS 6,927,517 B2 * 8/2005 Brunet ............... F16C 32/0457
310/90.5
7,462,950 B2 12/2008 Hu
8,183,731 B2 5/2012 Epstein
(Continued)

FOREIGN PATENT DOCUMENTS

CN 102739119 A 10/2012
CN 103397974 A 11/2013
(Continued)

OTHER PUBLICATIONS

"Bolshoi entsiklopedichesky slovar. Politekhnichesky" pod red. A. Yu. Ishlinkogo, Nauchnoe Izdatelstvo "Bolshaya Rossiiskaya Entsiklopediya", Moskva, 2000.
(Continued)

*Primary Examiner* — Robert W Horn
(74) *Attorney, Agent, or Firm* — David Postolski; Gearhart Law LLC

(57) ABSTRACT

A device for generating an electric charge, having: a base; at last one capacitor; at least one magnet; a cover; a splitter; a load; a conductive core; a frictionless surface; and at least one discharge point. The at least one capacitor adapted and configured to store electricity generated from the electric charge. The splitter is adapted and configured to receive a first portion of electricity from the conductive core and divert a second portion of electricity back to the at least one capacitor and further divert a third portion of electricity to the load. The load is adapted and configured to store electricity and use a fraction of the total electricity generated by the device. The at least one magnet is adapted and configured to levitate and rotate on an electromagnetic rail around said conductive core in an infinite loop, wherein said rotation causes a magnetic field.

17 Claims, 14 Drawing Sheets

(56) References Cited

U.S. PATENT DOCUMENTS

| | | |
|---|---|---|
| 8,513,849 B2 | 8/2013 | Epstein |
| 8,664,824 B1 | 3/2014 | Epstein et al. |
| 8,777,519 B1 | 7/2014 | Henderson |
| 8,829,742 B2 | 9/2014 | Wu et al. |
| 9,126,487 B2 | 9/2015 | Henderson |
| 9,148,077 B2 | 9/2015 | Henderson |
| 10,320,272 B1 | 6/2019 | Juarez |
| 10,487,875 B2 | 11/2019 | Kozaki |
| 10,804,782 B2* | 10/2020 | Wong .................. H02K 35/02 |
| 10,807,478 B2* | 10/2020 | Irvin, Sr. .............. B60L 13/04 |
| 10,955,000 B2* | 3/2021 | Candelaria .......... F16C 32/0431 |
| 2002/0047400 A1 | 4/2002 | Ueyama |
| 2005/0236918 A1* | 10/2005 | van den Bergh ...... H02K 39/00 310/156.43 |
| 2007/0089636 A1 | 4/2007 | Guardo |
| 2011/0304232 A1 | 12/2011 | Rush |
| 2013/0266429 A1 | 10/2013 | Andrews |
| 2013/0341920 A1* | 12/2013 | Vargas ................. H02N 15/00 290/3 |
| 2014/0311060 A1 | 10/2014 | Henderson |
| 2016/0036310 A1* | 2/2016 | Letts .................... H02K 53/00 74/DIG. 9 |
| 2016/0352158 A1 | 12/2016 | McGee |
| 2017/0222536 A1 | 8/2017 | Chrivia |
| 2017/0288526 A1 | 10/2017 | Alheraiqi |
| 2018/0375418 A1 | 12/2018 | Letts |
| 2019/0170151 A1 | 6/2019 | Sakawaki |
| 2019/0390561 A1* | 12/2019 | Defrancia ............. F03D 1/02 |
| 2021/0110955 A1* | 4/2021 | Letts .................... F01D 15/10 |

FOREIGN PATENT DOCUMENTS

| | | |
|---|---|---|
| EP | 2536009 A1 | 12/2012 |
| WO | 2007021206 A1 | 2/2007 |
| WO | 2009074128 A2 | 7/2009 |
| WO | 2014107550 A1 | 7/2014 |
| WO | 2014149626 A1 | 9/2014 |
| WO | 2016019221 A1 | 2/2016 |

OTHER PUBLICATIONS

International Preliminary Report on Patentability, dated Feb. 7, 2017, for corresponding PCT Application No. PCT/US2015/043067, International Filing Date of Jul. 31, 2015, consisting of 1 Page.

International Search Report, dated Dec. 3, 2015, for corresponding PCT Application No. PCT/US2015/043067, International Filing Date of Jul. 31, 2015, consisting of 2 Pages.

Written Opinion, dated Oct. 23, 2015, for corresponding PCT Application No. PCT/US2015/043067, International Filing Date of Jul. 31, 2015, consisting of 4 Pages.

* cited by examiner

MAGNETIC LEVITATION ELECTRICAL GENERATOR

CLAIM OF PRIORITY

This application is a U.S. Non-Provisional and Continuation-in-Part (CIP) Patent Application that claims priority to U.S. Non-Provisional patent application Ser. No. 16/108,439 filed on Aug. 22, 2018 and published as U.S. Published Patent Application No. 2018/0375418 A1 on Dec. 27, 2018, which is a U.S. Non-Provisional and CIP Patent Application of U.S. patent application Ser. No. 14/814,600 filed on Jul. 31, 2015 and published as U.S. Published Patent Application No. 2016/0036310 A1 on Feb. 4, 206, which claims priority to U.S. Provisional Patent Application Ser. No. 62/031,878 filed on Aug. 1, 2014, the contents of which are hereby incorporated by reference herein in their entirety.

FIELD OF THE EMBODIMENTS

The invention and its embodiments relate to a magnetic levitation electricity generating device.

BACKGROUND OF THE EMBODIMENTS

Magnetic Levitation (or as it is also known Maglev) Power Generation is the process of electricity generation created by producing a magnetic field that rotates around a conductor like gold, silver, copper etc. The rotating magnetic field around the conductor produces electricity which flows through the conductor to power another device. A portion of the electricity produced will be syphoned back to a capacitor bank to keep the magnetic field energized. The magnetic field is rotated on a magnetically levitated surface to produce a constant motion and output at any speed.

Known previous in the art is:

WO 2007/021206 discloses a magnetic levitated transport system comprising a magnetic levitation guideway, and a magnetic levitation vehicle traversing said magnetic levitation guideway; said magnetic levitation guideway being defined by a pair of continuous parallel vehicle levitation guideways, each having a plurality of spaced apart rotating passive magnetic disc assemblies, a linear guideway electric generators interconnecting said passive magnetic disc assemblies, and a ferromagnetic attractive propulsion guideway disposed co-extensive with said magnetic levitation guideway; and said magnetic levitation vehicle being defined by a vehicle body, a magnetic suspension stabilizer disposed at the lower opposing sides of said vehicle body, including a plurality of electromagnetic array spinning discs spacedly disposed in a linear pattern thereof and in levitating communication with said magnetic disc assemblies, and a plurality of spaced apart pairs of magnetic propulsion wheel assemblies disposed linearly at the middle bottom portion of said vehicle body, each having a conical wheel defined by a conically shaped plurality of electromagnets angularity disposed thereof wherein at least a surface attractively communication with said ferromagnetic attractive propulsion guideway.

U.S. Pat. No. 7,462,950 teaches a magnetic levitation weight reduction structure for a vertical wind turbine generator includes a frame, a fixed permanent magnet, an axle, a revolving permanent magnet, a blade hub, and a generator. The fixed permanent magnet fixed to the frame has a first repulsive surface. The axle is connected to the frame. The revolving permanent magnet fixed to the axle has a second repulsive surface in relation to the first repulsive surface of the fixed permanent magnet. Both the first and the second repulsive surfaces repel with each other. The blade hub and the generator are connected to the axle. When the revolving permanent magnet is rotated, the axle functions as a balance center.

U.S. Publication No. 2013/0266429 discloses a turbine assembly which includes a split venturi shroud with two halves in hinged engagement about a vertical hinge axis that bisects the venturi shroud, a split clam jacket with two halves each attached to one of the two halves of the venturi shroud, and a rotor ring including an outer rim and a plurality of propeller blades within the outer rim. The rotor ring and venturi shroud are a rotor and a stator, respectively, of the turbine assembly. The venturi shroud is mountable on a support structure by transitioning from a folded state to an unfolded state. The clam jacket is open when the venturi shroud is folded and closed when the venturi shroud is unfolded, at least a portion of the support structure is surrounded by the clam jacket when in the unfolded state. The rotor ring can be mounted on the venturi shroud.

WO 2009/074128 discloses a maglev railway comprising a support and drive system of the long stator-linear motor type, magnetic support poles that are situated in the vehicle being additionally provided with linear generator windings (10) that generate electric energy in the vehicle. The aim of the invention is to prevent unwanted, periodic vibrations (ripples) from being generated at low speeds. To achieve this, according to the invention, the teeth (5) and grooves (6) of the long stator (3) are arranged in high-speed sections (2a) parallel to the cores and the linear generator windings (10) of the support magnets provided in said cores and in low-speed sections (2b) obliquely to said cores (7) and linear generator windings.

U.S. Pat. No. 8,829,742 teaches a high efficiency permanent magnet machine capable of maintaining high power density. The machine is operable over a wide range of power output. The improved efficiency is due in part to copper wires with a current density lower than traditional designs and larger permanent magnets coupled with a large air gap. In a certain embodiment wide stator teeth are used to provide additional improved efficiency through significantly reducing magnetic saturation resulting in lower current. The machine also has a much smaller torque angle than that in traditional design at rated load and thus has a higher overload handling capability and improved efficiency. In addition, when the machine is used as a motor, an adaptive phase lag compensation scheme helps the sensorless field oriented control (FOC) scheme to perform more accurately.

U.S. Pat. No. 8,664,824 (and similarly U.S. Pat. Nos. 8,183,731 and 8,513,849) teaches a Halbach array which is radially disposed in an environment optimized for efficiency and controlled for efficient generation and use of power in order to generate, establish, and maintain a desired level of rotational energy with enhanced efficiency and in order to make the most efficient use of electromotive forces and magnetic fields which are either intentionally created for the operation of the apparatus or which result from the operation of the apparatus.

Various devices are known in the art. However, their structure and means of operation are substantially different from the present invention. Such devices fail to provide a device that is powered by a capacitor bank and not powered by a battery or chemical power. Such devices also contain many moving parts and therefore there is a need for a device that uses less energy and thus a larger energy output by having only one moving part and one conductive core. At least one embodiment of this invention is presented in the drawings below, and will be described in more detail herein.

SUMMARY OF THE EMBODIMENTS

The present invention comprises a device for generating an electric charge, comprising: a base; at least one capacitor; at least one magnet; a cover; a splitter; a load; a conductive core; a frictionless surface; and at least one discharge point. The at least one capacitor adapted and configured to store electricity generated from the electric charge. The splitter is adapted and configured to receive a first portion of electricity from the conductive core and divert a second portion of electricity back to the at least one capacitor and further divert a third portion of electricity to the load. The load is adapted and configured to store electricity and use a fraction of the total electricity generated by the device. The conductive core is positioned on the frictionless surface. Then at least one magnet is adapted and configured to levitate and rotate on an electromagnetic rail around said conductive core in an infinite loop, wherein said rotation causes a magnetic field. The magnetic field is sustained by the at least one magnet and enables the electric charge to be perpetual. Then at least one discharge point is external to said device and energy is distributed to the external at least one discharge point.

Electricity is released from at least one capacitor in series or in parallel to the electromagnets. The at least one magnet may be comprised of neodymium. The conductive core may comprised of a copper, gold, silver coil or disc. The conductive core is affixed to at least one magnet and to the base of the unit. At least one magnet is comprised of at least one electromagnetic rail which spins in parallel.

The present invention also teaches a method for generating an electric charge, the steps comprising: rotating and levitating of at least one magnet on an electromagnetic rail around a conductive core in an infinite loop; wherein said rotation causing a magnetic field such that an electric charge is generated; storing the electric charge in at least one capacitor; receiving a first portion of the electric charge by a splitter; diverting a second portion of the electric charge back to the at least one capacitor; and further diverting a third portion of the electric charge to a load; using by the load a fraction of the total electric charge generated by the device; and storing by the load the remainder of the total electric charge generated.

It is an object of the present invention that the device comprises only one moving part.

It is an object of the present invention wherein the device generates an uninterrupted electrical current as long as device is powered and the at least one magnet is rotating.

It is an object of the present invention wherein the device requires no lubrication.

DESCRIPTION OF THE PREFERRED EMBODIMENTS

Figure 1:
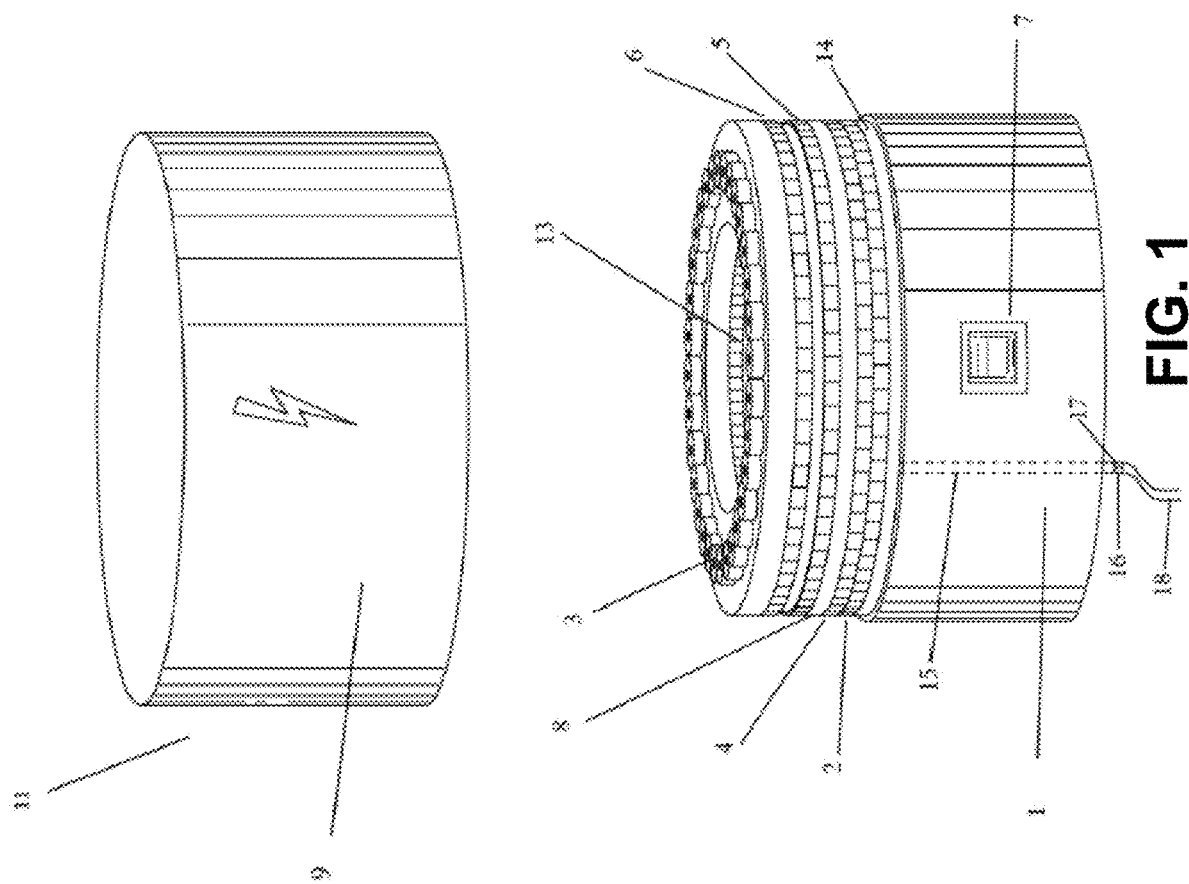
FIG. 1 depicts a perspective illustrative view of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 is a perspective illustrative view of the present invention, a magnetic levitation electrical generator device 11. The magnetic levitation electrical generator device 11 comprises a base 1 and a cover 9. The base 1 and the cover 9 may be made of various nonmagnetic materials so as not to disrupt the magnetic forces of the generator. Such nonmagnetic materials may include rubber, plastic, stainless steel, feather, paper, mica, gold, silver, or leather. The base includes a manual power switch 7 which may be used to turn on or power the device off. The base 1 and cover 9 may be of various shapes and sizes. In a preferred embodiment, the base 1 and cover 9 are cylindrical or round in shape.

The cover 9 is adapted and configured to cover the components of the magnetic levitation electrical generator device 11 that are secured to the base 1. In a preferred embodiment, the external diameter of the magnetic levitation electrical generator device 11 is 10 inches and the height is 8 inches. In another embodiment the diameter can be larger or smaller depending on the device in which the invention is powering. The cover 9 or head moves around the conductive core. In a preferred embodiment of the invention, the base 1 and the cover 9 may be connected by a twist groove mechanism, screws or other securing mechanisms.

FIG. 1 also shows the components of the magnetic levitation electrical generator device 11. The magnetic levitation electrical generator device 11 is comprised of a magnetic levitation bottom rail 2 and a magnetic levitation top rail 4. The magnetic levitation top rail 4 is above the magnetic levitation bottom rail 2, as depicted.

Figure 12:
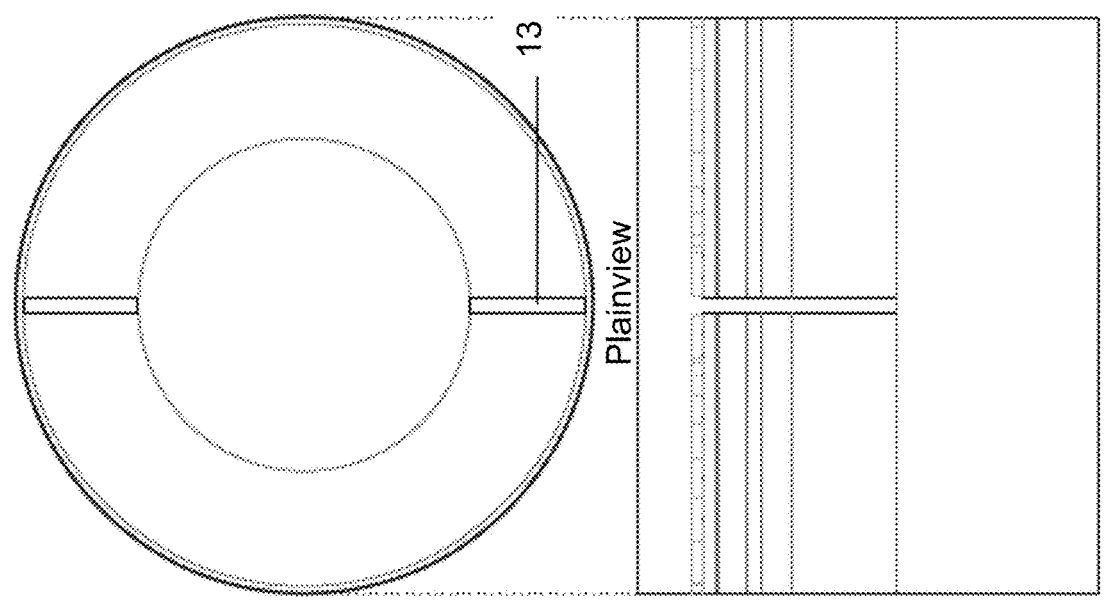
FIG. 12 depicts a schematic diagram of a coil system of the present invention.

The magnetic levitation top rail 4 and the magnetic levitation bottom rail 2 are connected via magnetic force. The magnetic levitation top rail 4 and the magnetic levitation bottom rail 2 may spin and rotate in one direction or the magnetic levitation top rail 4 may spin and rotate in an opposite direction than the magnetic levitation bottom rail 2. In a preferred embodiment, the magnetic levitation bottom rail 2 is affixed and does not move. The magnetic levitation electrical generator device 11 contains a conductive core 8 which is positioned on a frictionless surface 13 (as depicted in FIG. 12). The conductive core is affixed to the base.

Figure 14:
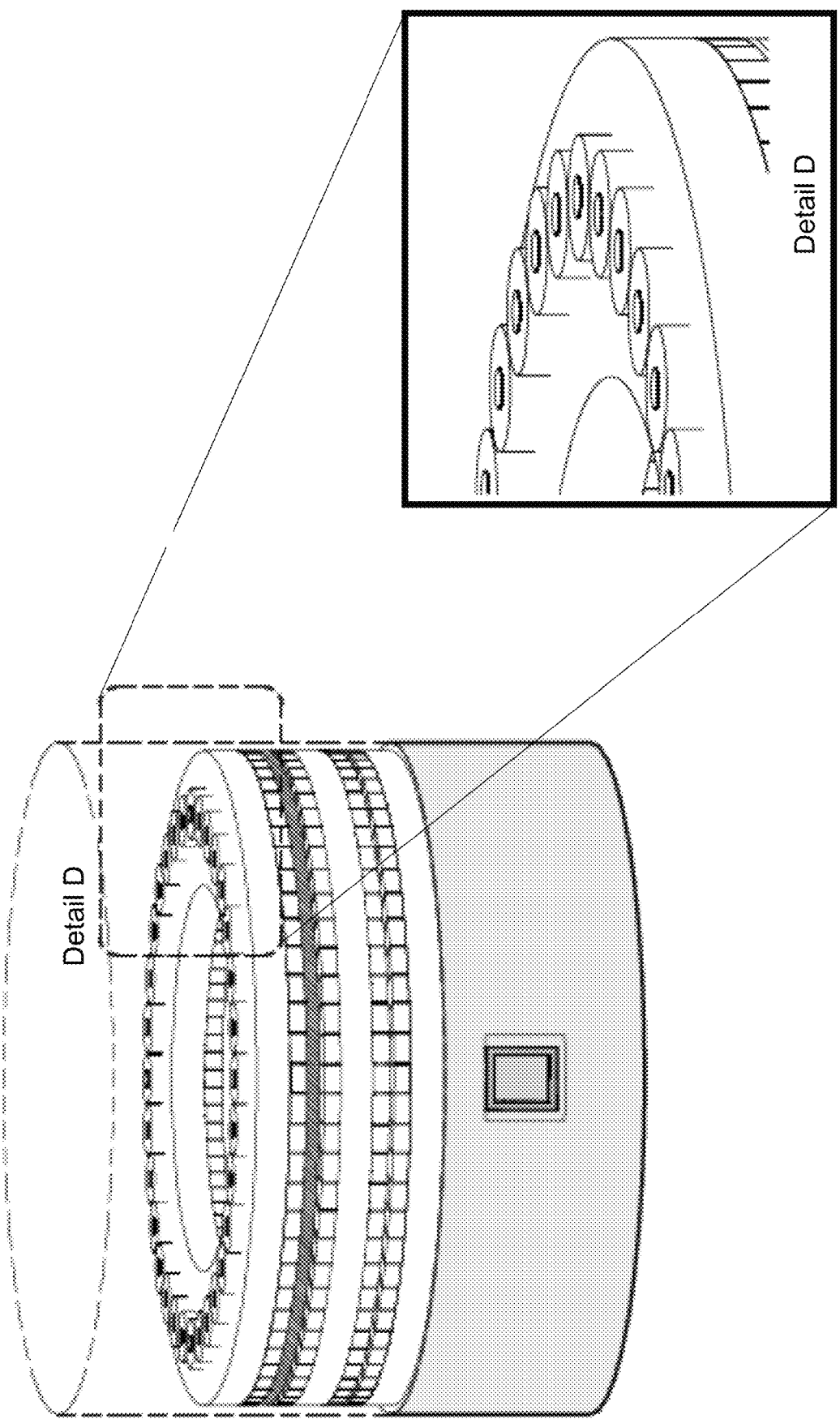
FIG. 14 depicts a schematic diagram of capacitors of the present invention.

Positioned above the conductive core 8 is a bottom portion of magnets 5 and a top portion of magnets 6. The bottom portion of magnets 5 and the top portion of magnets 6 may be comprised of neodymium or any natural magnets. In another embodiment, the bottom portion of magnets 5 and the top portion of magnets 6 of the magnetic levitation electrical generator device 11 may be comprised of ferromagnetic material, such as iron, nickel, cobalt, and/or alnico (an aluminum-nickel-cobalt alloy). The bottom portion of magnets 5 and the top portion of magnets 6 also spin and rotate to create a magnetic field. The magnetic field creates electrical charges and currents. The generated electrical charge and current is captured by the capacitors 3, which are positioned above the neodymium bottom portion of magnets 5 and the top portion of magnets 6. The capacitors 3 store electricity generated from the electric charge. Moreover, FIG. 14 depicts a schematic diagram of capacitors of the present invention.

In a preferred embodiment, there is at least one capacitor 3. In another embodiment, there are a plurality of capacitors 3 which are connected to each in a shape corresponding to or complimentary to the magnetic levitation bottom rail 2 and the magnetic levitation top rail 4. Regardless of the amount of capacitors 3, they act as a bank to store electricity generated by the magnetic levitation electrical generator device 11. n a preferred embodiment, there is at least one magnet. In another embodiment, there are a plurality of magnets which are connected to one another by magnetic forces or which have been soldered together. The shape of the magnetic rails (e.g., the magnetic levitation top rail 4 and the magnetic levitation bottom rail 2) may correspond and compliment the shape and number of capacitors 3. However, this is not a requirement of the magnetic levitation electrical generator device 11.

Figure 2:
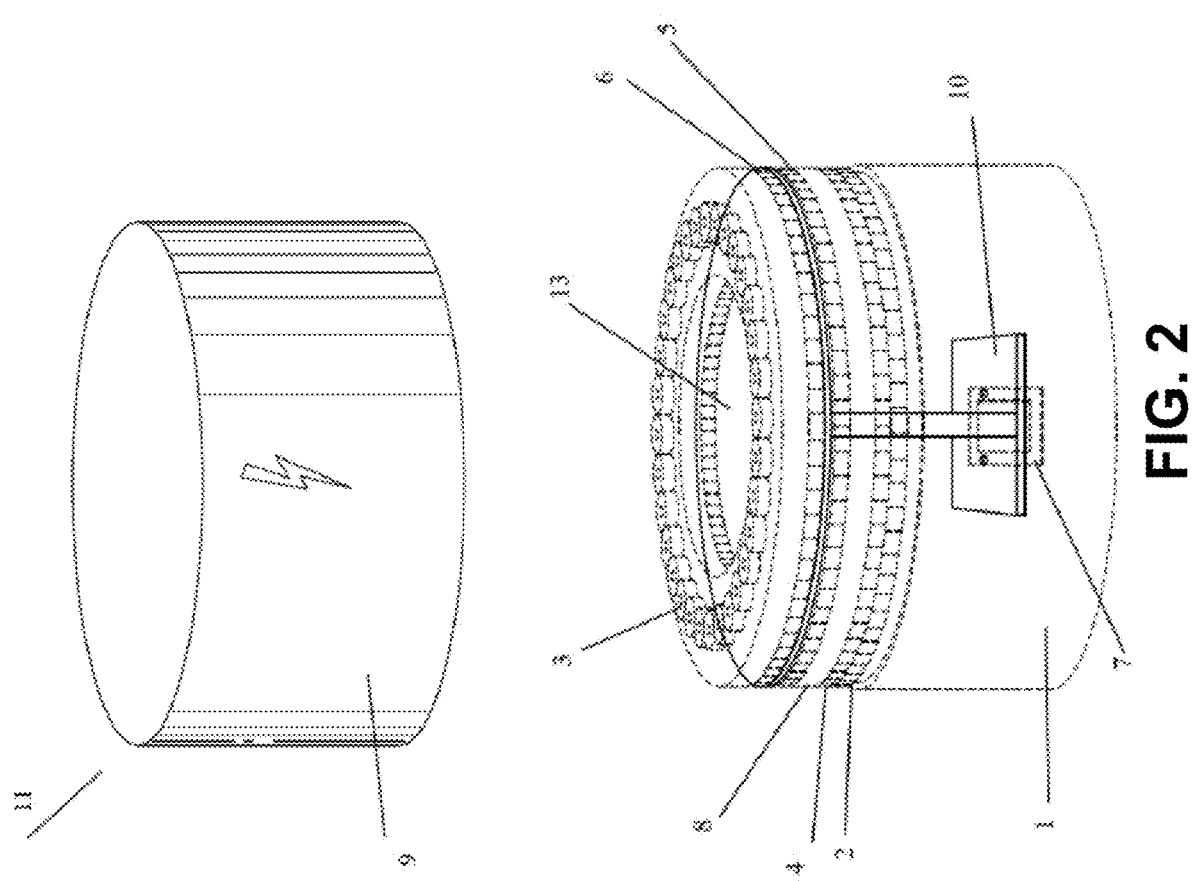
FIG. 2 depicts an alternative illustrative view of the present invention.
Figure 3:
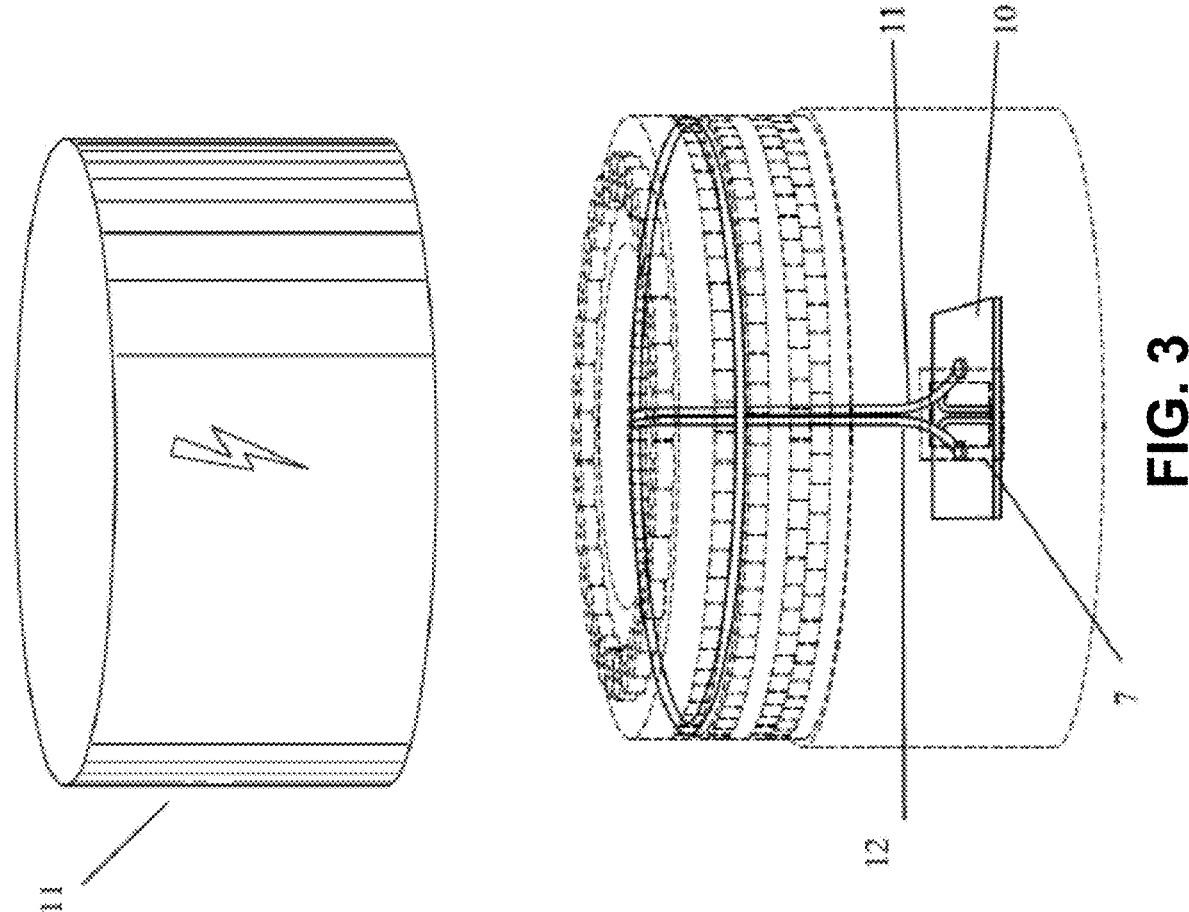
FIG. 3 depicts an alternative illustrative view of the present invention.

FIG. 2 shows the magnetic levitation electrical generator device 11. A base plate 10 secures a positive lead 11 and a negative lead 12 (the electrical polarity as shown in FIG. 3) which carries the electrical charge and current created by the rotating and levitation magnets. According to an embodiment, the magnetic levitation electrical generator device 11 is capable of generating electricity on its own without a need for an outside current. According to an embodiment, an initial current from an outside source 18 flows through the magnetic levitation electrical generator device 11 to aid the magnetic levitation electrical generator device 11 in initially generating electricity. This initial current causes the magnets (e.g., the bottom portion of magnets 5 and the top portion of magnets 6) of the magnetic levitation electrical generator device 11 to rotate, causing the magnetic levitation electrical generator device 11 to generate its own current. According to an embodiment, once the magnetic levitation electrical generator device 11 generates its own current, the initial current can be removed. According to an embodiment, once the magnetic levitation electrical generator device 11 generates its own current, the magnetic levitation electrical generator device 11 produces electricity that can be stored and/or used to power one or more devices.

According to an embodiment, the initial current originates from a device separate and apart from the magnetic levitation electrical generator device 11. According to an embodiment, the initial current originates from a capacitor 3 and/or a capacitor bank. According to an embodiment, the initial current provides enough power to the magnetic levitation electrical generator device 11 to enable lift and rotation of the magnets (e.g., the bottom portion of magnets 5 and the top portion of magnets 6), enabling the magnetic levitation electrical generator device 11 to generate its own electricity. According to an embodiment, when the electromagnets are supplied with a sufficient amount of electric current, the magnets (e.g., the bottom portion of magnets 5 and the top portion of magnets 6) provide lift and rotation for the head, which houses one or more permanent magnets. According to an embodiment, the permanent magnets and the electromagnets are spaced far enough apart to enable the magnetic fields that they generate to not interact with each other. According to an embodiment, power flows through the stator 14, generating the magnetic field that causes rotation.

Figure 4:
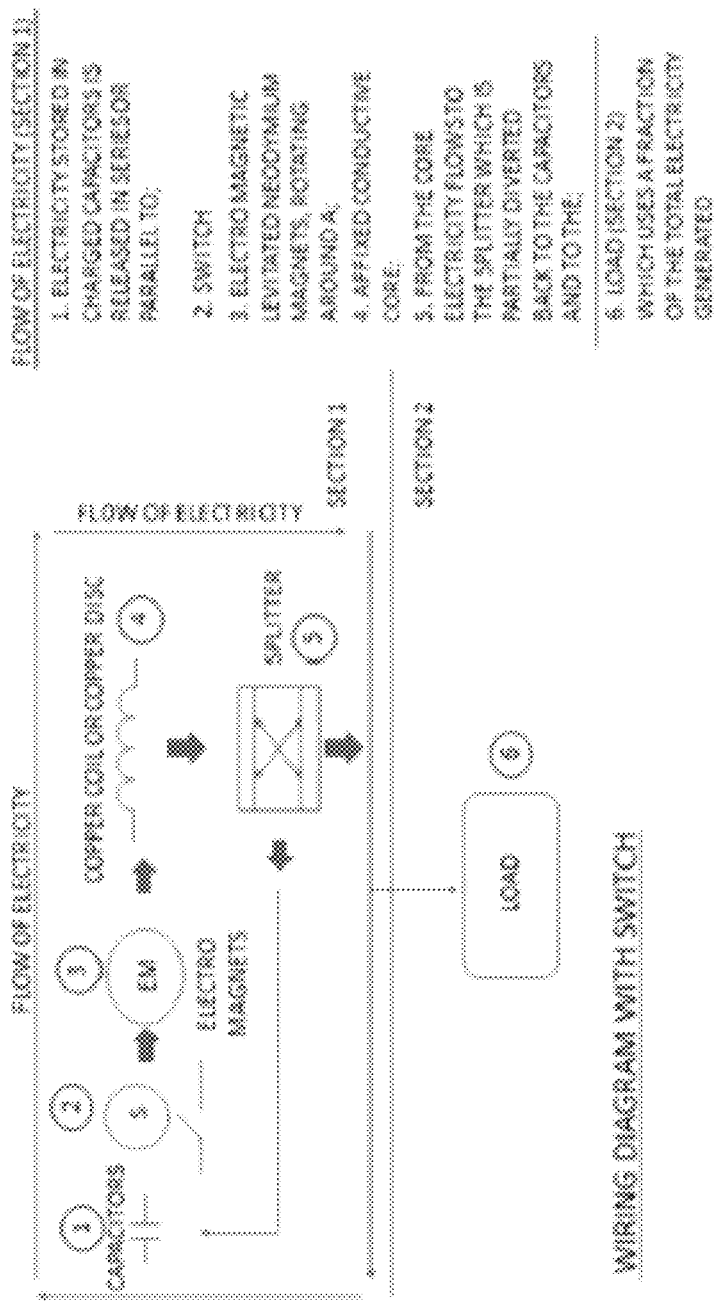
FIG. 4 depicts a schematic view of the flow of electricity of the present invention.
Figure 5:
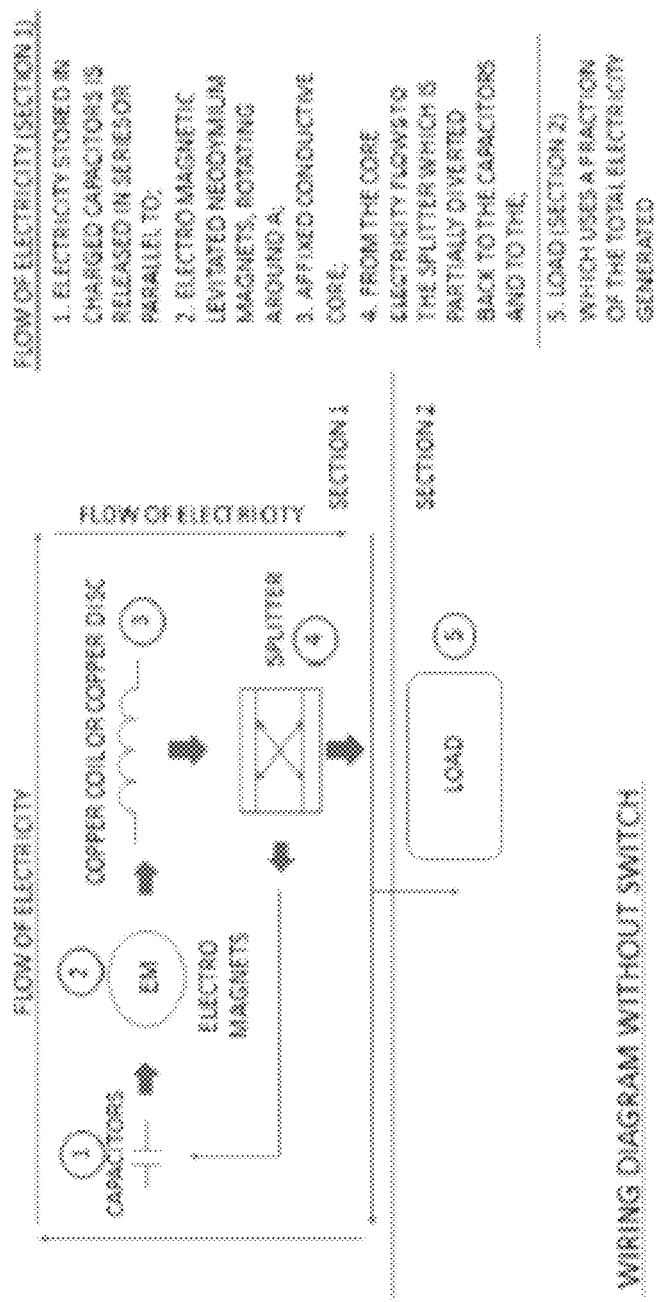
FIG. 5 depicts an alternative schematic view of the flow of electricity of the present invention.

FIG. 4 is schematic view of the flow of electricity throughout the present invention. First, as indicated by Step 1, electricity is stored in the capacitors 3 and is released in a series or parallel to the electromagnetic rails. Electricity is then released to a Switch in Step 2. The switch may be manually or remotely open or close the circuit to turn the magnetic levitation electrical generator device 11 on or off. In Step 3, electricity powers the electromagnetic levitated neodymium magnets which rotate around an affixed conductive core (Step 4). According to an embodiment, the neodymium magnets (or other types of suitable magnets) may rotate in either direction, as long as the magnets have alternating polarities. From the conductive core, electricity flows to a splitter. The splitter may partially divert electricity back to the capacitors to start the electrical circuit again and to the Load (not shown). The Load uses a fraction of the total electricity generated by the elector magnetic levitated neodymium magnets. In another embodiment, the flow of electricity may not include a switch (as shown in FIG. 5) to turn the magnetic levitation electrical generator device 11 on or off.

Figure 13:
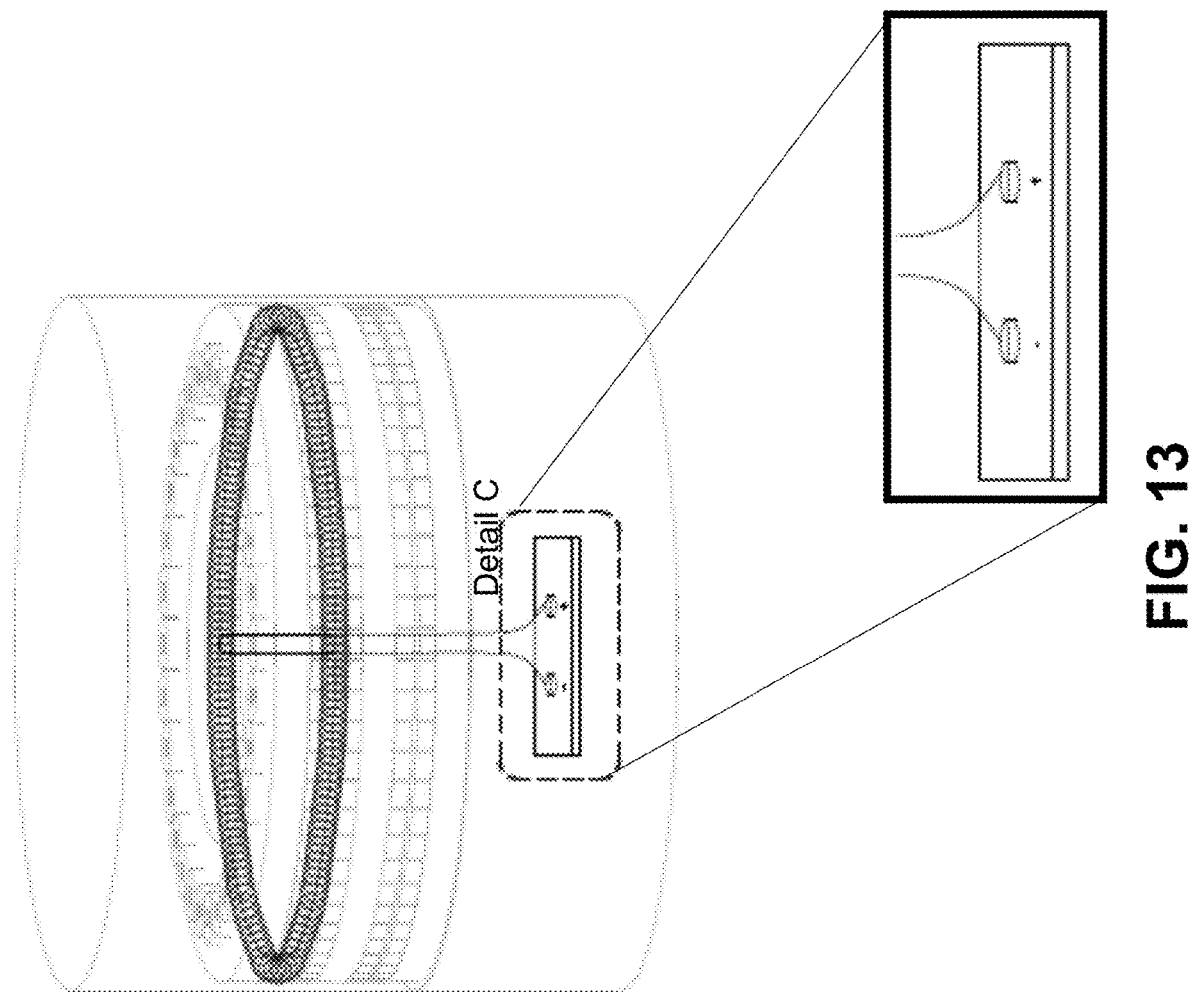
FIG. 13 depicts a schematic diagram of a coil design of the present invention.

The present invention provides an electricity producing generator device 11 with only one moving part. The generator combines the maglev technology with scalable output to deliver a constant amount of electricity as long as the magnetic levitation electrical generator device 11 is turned on. Once the magnetic levitation electrical generator device 11 is activated it can operate without interruption indefinitely and since the only moving part on the magnetic levitation electrical generator device 11 is magnetically levitated there is no need for lubrication. The magnetic levitation electrical generator device 11 delivers clean reliable renewable energy without any emissions and can be applied to virtually any device, vehicle or structure. An electric charge can be sustained in a magnetic field in an infinite loop to sustain the charge and distribute some energy to an external discharge point or points. The magnetic field is sustained by rotating magnets around a conductive core on a frictionless surface produced by magnetic levitation. The conductive core is a copper coil that is not a continuous ring; the ends form the terminal for the electricity to exit the device. The design of the coil is depicted in FIG. 13.

Figure 6:
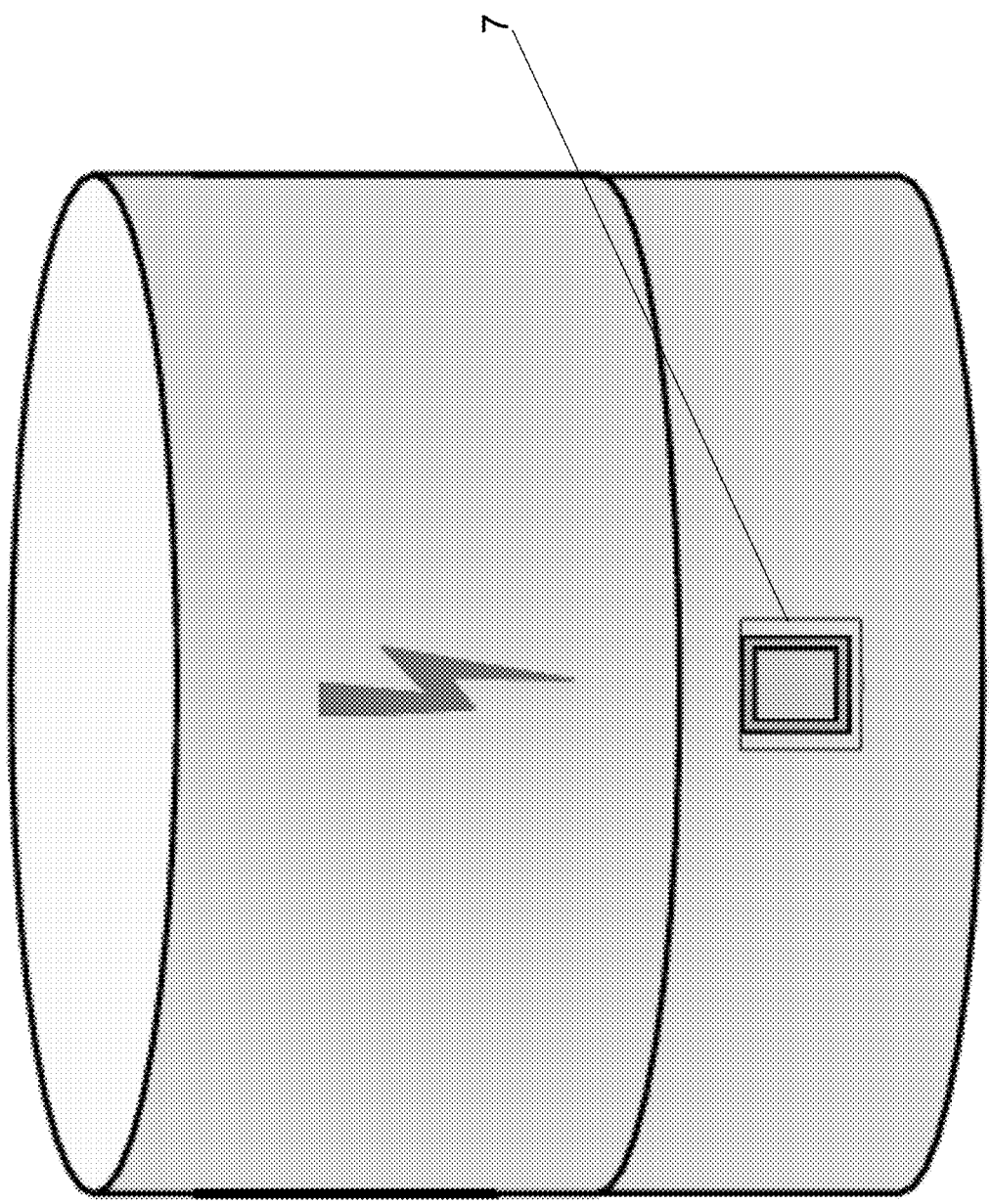
FIG. 6 depicts a perspective view of a generator of the present invention.

The magnets are electromagnetic magnets and may also include full-permanent magnets. This includes magnets 5 and 6. The full-permanent magnet and are comprised of neodymium ("rare earth") magnets so that there is no energy loss through friction. Such magnets help reduce maintenance costs and increases the lifespan of the generator (of FIG. 6). According to an embodiment, the full-permanent magnets are arranged in alternating polarities. The magnetic field that the full-permanent magnets generate interacts with the coil. When the full-permanent magnets rotate, the gaps in the coil cause a break in the magnetic field which enables the generation of electricity. According to an embodiment, this generated electricity is collated by a stator 14 and travels down a shaft 15 to positive 16 and negative 17 terminals. According to an embodiment, the stator 14 is affixed to the base 7 of the magnetic levitation electrical generator device 11.

According to an embodiment, the magnetic levitation electrical generator device 11 includes the shaft 15 for transporting the electricity from the shaft to the positive 16 and negative 17 terminals. According to an embodiment, initial power is sent through the shaft 15 to the magnetic levitation electrical generator device 11 to provide an initial current to initialize rotation of the discs. According to an embodiment, the initial power is provided by a capacitor or capacitor bank. It is noted, however, that other means of providing the initial power may also be used, while maintaining the spirit of the present invention.

Figure 7:
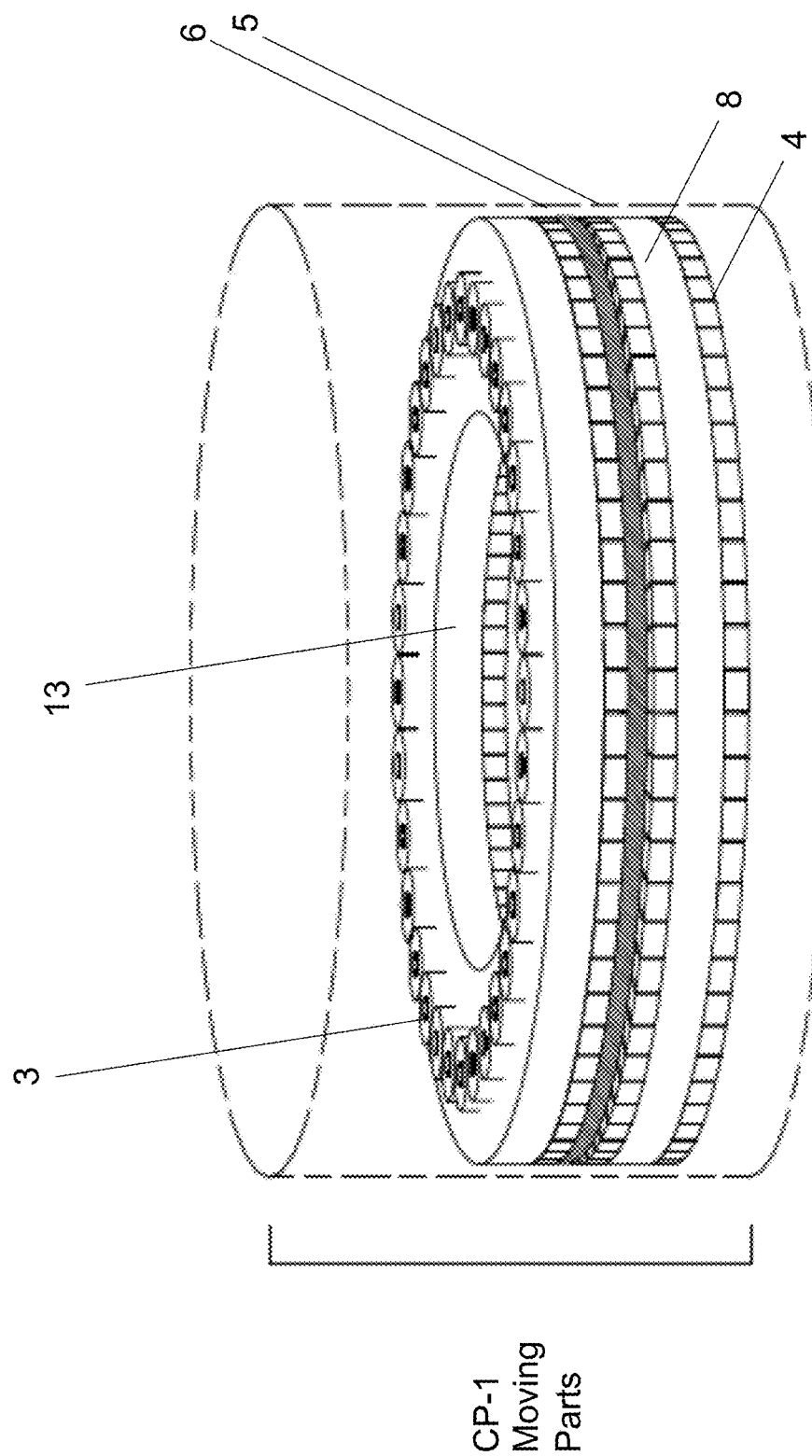
FIG. 7 depicts a perspective view of moving parts of the present invention.

It should be appreciated that the central part of the magnetic levitation electrical generator device 11 is hollow to allow for other components to be installed. The moving parts of the magnetic levitation electrical generator device 11 are denoted "CP-1" and are depicted at least in FIG. 7, FIG. 10, and FIG. 11. The components labeled CP-1 are the part of the magnetic levitation electrical generator device 11 that is levitated and rotated, which generates the electricity. The cover 9 rotates and is a part of CP-1. The cover 9 houses all of the component, including the capacitor bank. In other embodiments, the capacitor bank is external to the magnetic levitation electrical generator device 11. The capacitors affixed in CP-1 is a storage bank for excess electricity that is generated. The PCB has capacitors as well, but those are built-in to keep circuits energized.

Figure 8:
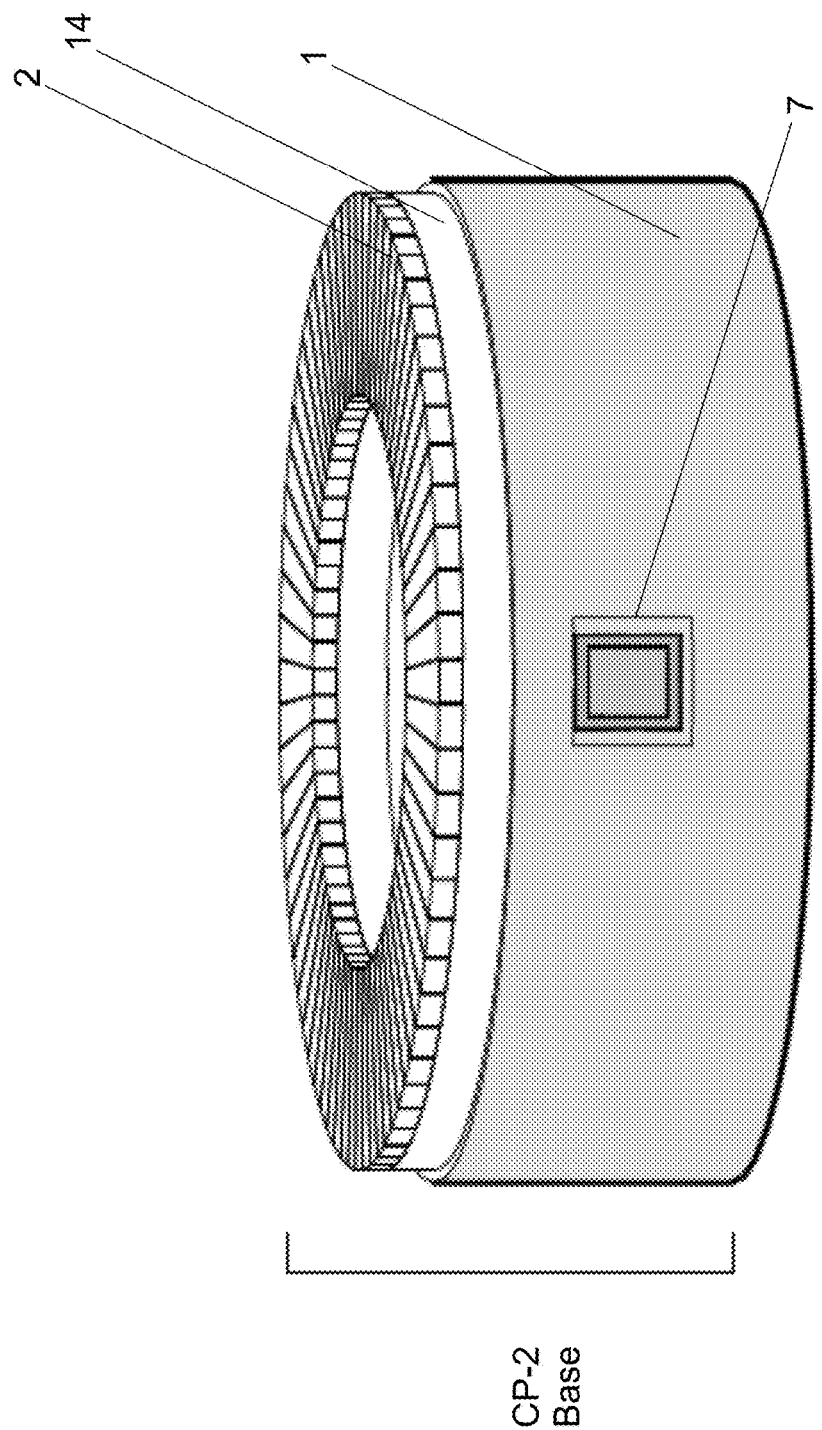
FIG. 8 depicts a perspective view of a base of the present invention.
Figure 10:
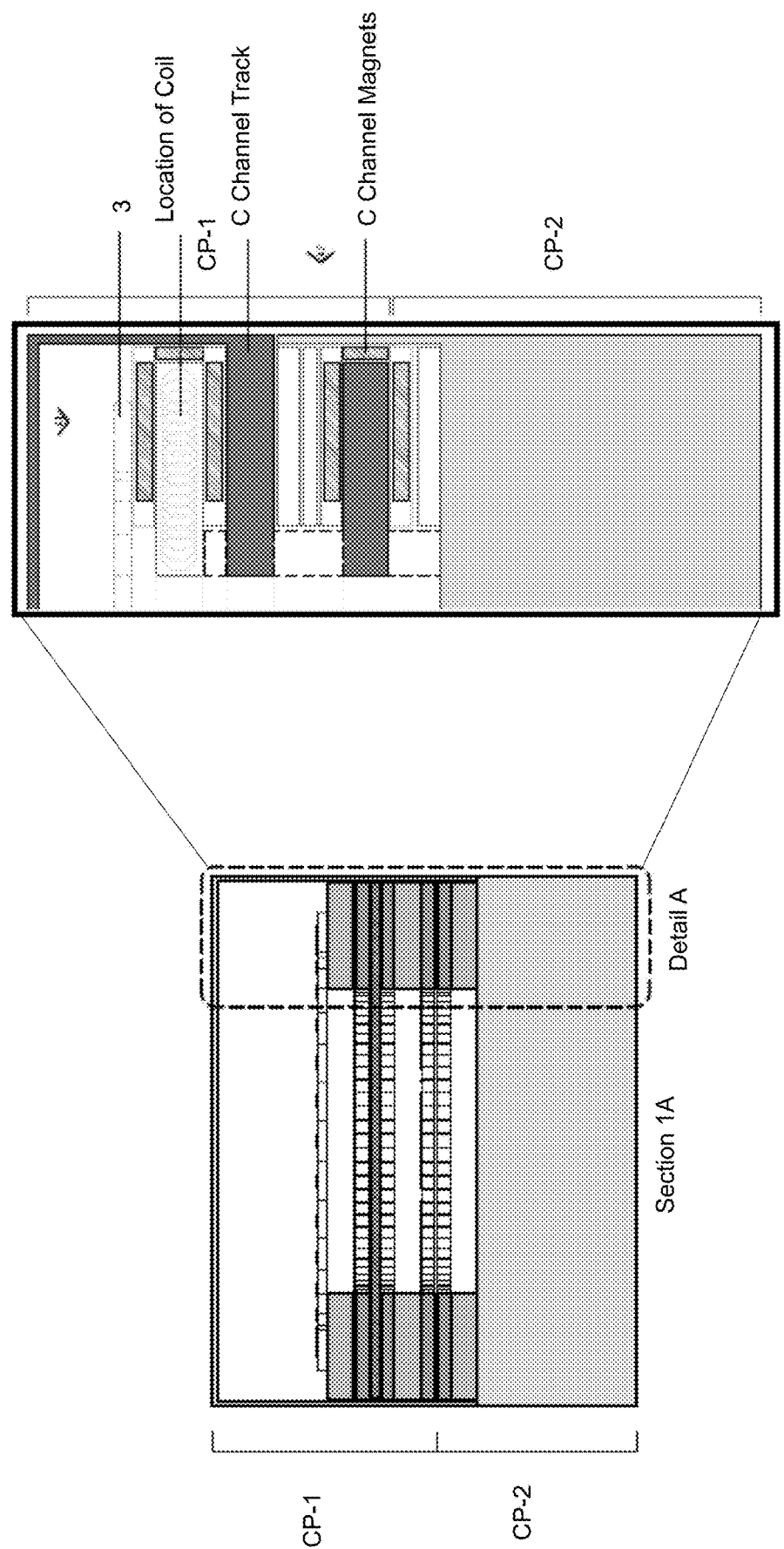
FIG. 10 depicts a schematic diagram of Section 1A of FIG. 9 of the present invention.
Figure 11:
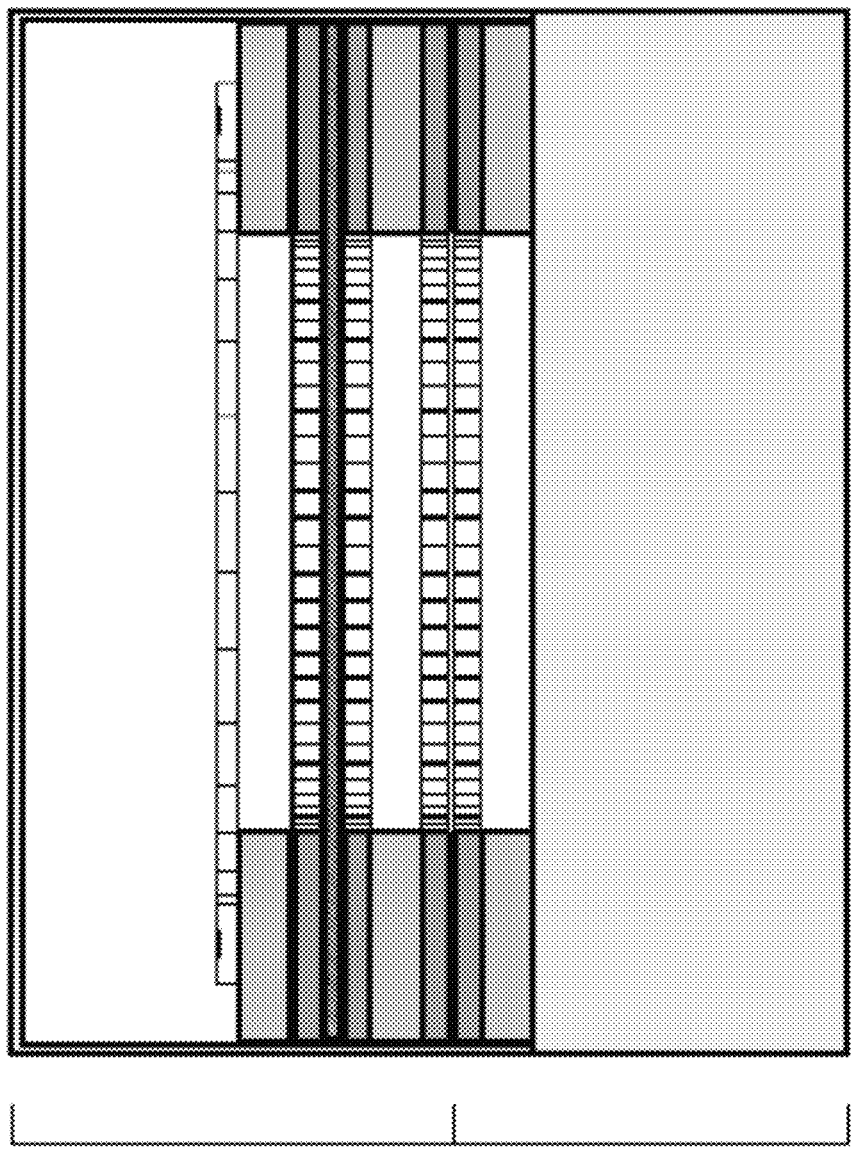
FIG. 11 depicts a schematic diagram of Section 1B of FIG. 9 of the present invention.

The non-moving parts of the invention (e.g. the magnetic levitation electrical generator device 11) are denoted "CP-2" and are depicted in at least FIG. 8, FIG. 10, and FIG. 11. The components labeled CP-2 are stationary and provide lift and rotation via the electromagnets and PCB. It should be appreciated that the conductive rail is stationary and is part of CP-2. It should be appreciated that in some examples, both CP-1 and CP-2 can be rotated in counter-directions to increase the output.

Figure 9:
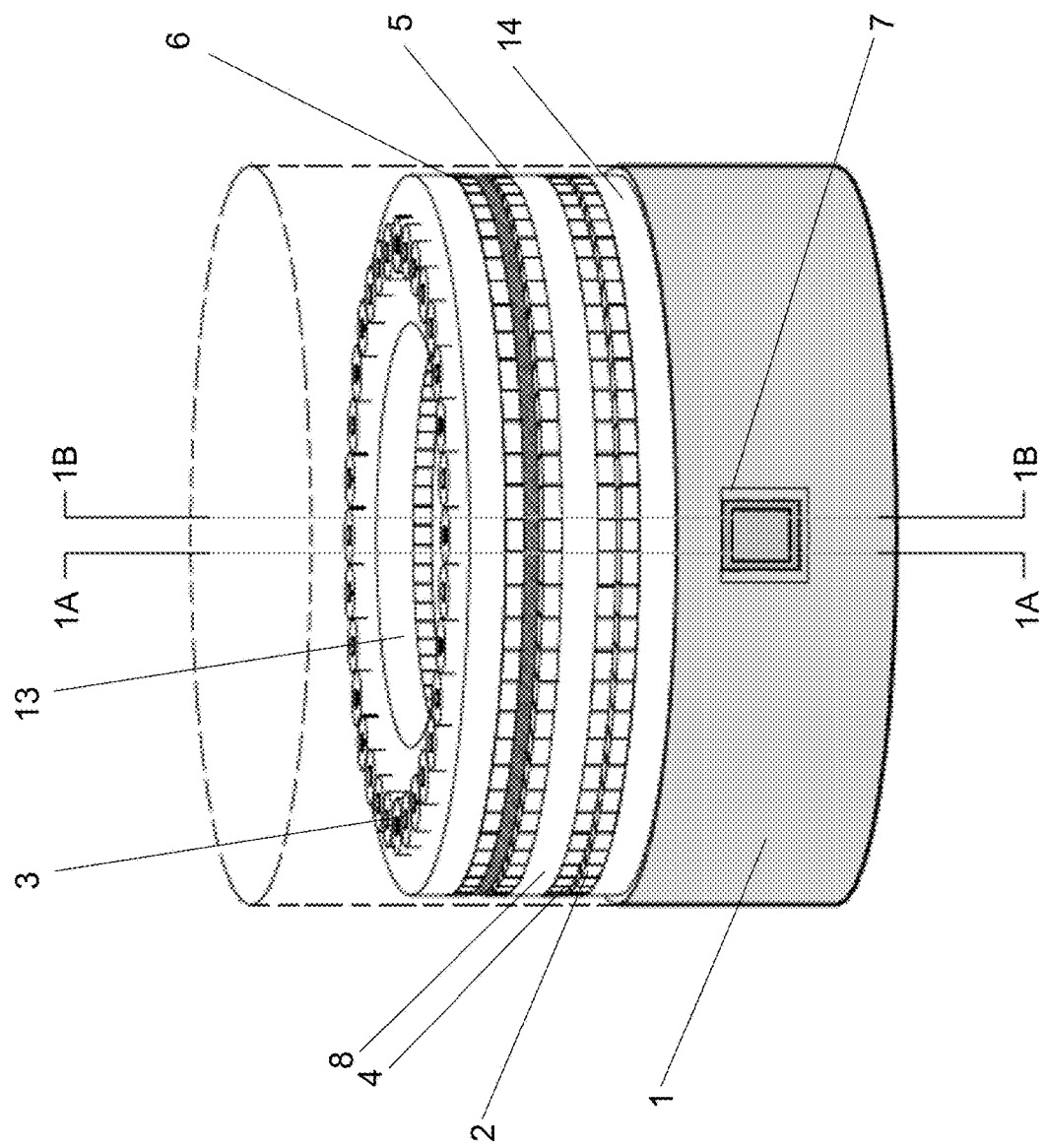
FIG. 9 depicts a front perspective view of internal components of the present invention.

FIG. 9 depicts internal components of the present invention, where FIG. 10 depicts Section 1A of FIG. 9 and FIG. 11 depicts Section 1B of FIG. 9. The location of the coils, C-Channel track, and C-Channel magnets are depicted in FIG. 10. The C-Channels have magnets on three (3) sides to provide stability as CP-1 rotates through the C-Channel. Rotation occurs when a signal from the PCB is delivered to the electromagnets at timed intervals at different locations on the C-Channel (as depicted in FIG. 10) in CP-2 so that the entire component of CP-1 traverses the path created.

It should further be appreciated that, as explained, each magnet has the opposite pole of the one that it is opposing it and is arranged in a NSNS configuration. The magnets in the C-Channel of CP-1 rotate around the fixed copper coil at a 90 degree angle which cuts across the lines of magnetism to produce electricity. The C-Channels form a ring but the ends are capped with insulators to prevent it from shorting the circuit. Moreover, harvesting or collection of electricity is being done in the instant invention by the stationary coil and may be transported to the capacitor through the diode or Silicon Control Rectifier (SCR).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A device for generating an electric charge, comprising:
   a base;
   at last one capacitor;
   at least one magnet;
   a cover;
   a splitter;
   a load;
   a conductive core;
   a low friction surface;
   at least one discharge point; wherein
      said at least one capacitor adapted and configured to store electricity generated from the electric charge;
      said splitter adapted and configured to receive electricity from the conductive core, said splitter including a first branch for diverting a first portion of said electricity back to the at least one capacitor, said splitter including a second branch for diverting a second portion of electricity to the load;
      said load adapted and configured to store electricity and use a fraction of the total electricity generated by the device;
      said conductive core positioned on the low friction surface;
      said at least one magnet adapted and configured to levitate and rotate relative to an electromagnetic rail in a loop, wherein said rotation causes a magnetic field to have varying orientations relative to the core such that an alternating electric current is generated in the core; wherein said magnetic field is sustained by the at least one magnet, the splitter having a diode such that the electric current from the core is changed to an electric charge; and
      said at least one discharge point external to said device and wherein energy is distributed through the second branch of the splitter to the external at least one discharge point.

2. The device of claim 1 wherein electricity is released from the at least one capacitor in series or in parallel to the electromagnetic rail.

3. The device of claim 1 wherein the at least one magnet is comprised of neodymium.

4. The device of claim 1 wherein the conductive core is comprised of a copper coil or a copper disc.

5. The device of claim 1, wherein the conductive core is affixed to the at least one magnet and to the base.

6. The device of claim 1, wherein the at least one magnet is comprised of at least one electromagnetic rail which spins in opposing directions.

7. A method for generating an electric charge, the steps of which comprising
- rotating and levitating at least one magnet relative to an electromagnetic rail in a loop; wherein said rotating of the magnet causes a magnetic field to have varying orientations relative to a conductive core such that an alternating electric current is generated in the core;
- directing the electric current from the core through a diode to change the current to an electric charge;
- receiving the electric charge by a splitter wherein a first branch thereof diverts a first portion of the electric charge to at least one capacitor;
- diverting a second portion of the electric charge received by the splitter to a second branch thereof that directs the second portion to a load;
- using by the load a fraction of the total electric charge generated by the device; and
- storing by the load the remainder of the total electric charge generated.

8. The method of claim 7 wherein electricity is released from the at least one capacitor in series or in parallel to the electromagnetic rail.

9. The method of claim 7 wherein the at least one magnet is comprised of neodymium.

10. The method of claim 7 wherein the conductive core is comprised of a copper coil or a copper disc.

11. The method of claim 7, wherein the conductive core is affixed to the at least one magnet and to the base.

12. The method of claim 7, wherein the at least one magnet is comprised of at least one electromagnetic rail which spins in opposing directions.

13. A device for generating an electric charge, comprising:
- a base;
- at last one capacitor;
- at least one magnet;
- a cover;
- a load;
- a conductive core;
- a low friction surface;
- at least one discharge point; wherein
    - said at least one capacitor adapted and configured to store electricity generated from the electric charge;
    - said load adapted and configured to store electricity and use a fraction of the total electricity generated by the device;
    - said conductive core positioned on the low friction surface;
    - said at least one magnet adapted and configured to levitate and rotate relative to an electromagnetic rail in a loop, wherein said rotation causes a magnetic field to have varying orientations relative to the core such that an alternating electric current is generated in the core; wherein said magnetic field is sustained by the at least one magnet;
    - a diode for changing the electric current from the core to an electric charge; and
    - said at least one discharge point external to said device and wherein energy is distributed to the external at least one discharge point.

14. The device of claim 13, wherein electricity is released from the at least one capacitor in series or in parallel to the electromagnetic rail.

15. The device of claim 13, wherein the at least one magnet is comprised of neodymium.

16. The device of claim 13, wherein the conductive core is comprised of a copper coil or a copper disc.

17. The device of claim 13, wherein the conductive core is affixed to the at least one magnet and to the base.

\* \* \* \* \*